(12) United States Patent
Tan et al.

(10) Patent No.: US 9,190,000 B2
(45) Date of Patent: Nov. 17, 2015

(54) LCD PANEL DRIVING METHOD, DRIVER CIRCUIT AND LCD DEVICE

(71) Applicant: Shenzhen China Star Optoelectronics Technology Co., Ltd, Shenzhen (CN)

(72) Inventors: Xiaoping Tan, Shenzhen (CN); Yong Zhang, Shenzhen (CN); Jiehui Qin, Shenzhen (CN)

(*) Notice: Subject to any disclaimer, the term of this patent is extended or adjusted under 35 U.S.C. 154(b) by 363 days.

(21) Appl. No.: 13/807,724

(22) PCT Filed: Dec. 18, 2012

(86) PCT No.: PCT/CN2012/086886
§ 371 (c)(1),
(2) Date: Dec. 29, 2012

(87) PCT Pub. No.: WO2014/089856
PCT Pub. Date: Jun. 19, 2014

(65) Prior Publication Data
US 2014/0168198 A1    Jun. 19, 2014

(30) Foreign Application Priority Data

Dec. 14, 2012  (CN) .......................... 2012 1 0541242

(51) Int. Cl.
*G06F 3/038* (2013.01)
*G09G 3/36* (2006.01)
*G06F 3/14* (2006.01)
*G09G 5/12* (2006.01)

(52) U.S. Cl.
CPC ............ *G09G 3/3611* (2013.01); *G06F 3/1446* (2013.01); *G09G 3/3666* (2013.01); *G09G 5/12* (2013.01); *G09G 2330/026* (2013.01)

(58) Field of Classification Search
None
See application file for complete search history.

(56) References Cited

U.S. PATENT DOCUMENTS

2010/0011249 A1*  1/2010  Kim .............................. 714/30
2011/0122163 A1*  5/2011  Suzuki et al. ................. 345/690

FOREIGN PATENT DOCUMENTS

| CN | 101009082 A | 8/2007 |
| CN | 101136189 A | 3/2008 |
| CN | 101739980 A | 6/2010 |
| CN | 101751882 A | 6/2010 |
| CN | 102479480 A | 5/2012 |
| CN | 102592531 A | 7/2012 |
| JP | 2012-118563 A | 6/2012 |

OTHER PUBLICATIONS

Xi Wanhua, the International Searching Authority written comments, Sep. 2013, CN.

* cited by examiner

*Primary Examiner* — Joseph Haley
*Assistant Examiner* — Ifedayo Iluyomade

(57) ABSTRACT

A driving method for liquid crystal display (LCD) panel includes the following steps: A. sending feedback signals to a monitoring module before timing control modules (T-CONs) sends driving signals to drive display of the LCD panel; B. generating control signals when the monitoring module receives the feedback signal of each of the T-CONs, and then simultaneously sending the control signals to each of the T-CONs; C. sending a driving signal to drive display of the LCD panel when each of the T-CONs receives the control signal.

15 Claims, 4 Drawing Sheets

LCD PANEL DRIVING METHOD, DRIVER CIRCUIT AND LCD DEVICE

TECHNICAL FIELD

The present disclosure relates to the field of liquid crystal displays (LCDs), and more particularly to an LCD panel driving method, a driver circuit, and an LCD device.

BACKGROUND

As shown in FIG. 1, for an ordinary liquid crystal display (LCD) panel having a low resolution (suppose the panel resolution is 1366×768), an input signal is sent to a timing control module (T-CON) 2 by an input signal connector 1 of a printed circuit board (PCB) 3, and the T-CON provides a distinguishable data signal to a source driver 4, and provides a timing control signal to the source driver 4 and a gate driver 5. For a high-level display device having a high resolution (the resolution of the display panel is 4K×2K or higher), because of a large number of data, a data transmission speed of the source driver and the T-CON is limited, usually more than twice the number of the source drivers, the gate drivers and the T-CONs (compared with the number of the source drivers, the gate drivers and the T-CONs shown in FIG. 1) are needed. When the number of the T-CONs is more than one, usually one field programmable gate array (FPGA) is needed to comprehensively arrange the data and control signals of a plurality of T-CONs. Suppose the LCD panel is divided into four areas to control the panel (as shown in FIG. 2A and FIG. 2B), four T-CONs are needed to control the data and the control signals of the four areas of the LCD panel (as shown in FIG. 3), respectively. When the LCD panel is controlled by a plurality of the areas, there is a certain delay in the data and control signals transmitted from different T-CONs to all of the areas of the LCD panel, which makes an asynchronous of display images of different areas and abnormal power-on display.

SUMMARY

In view of the above-described problems, the aim of the present disclosure is to provide a liquid crystal display (LCD) panel driving method, a driver circuit, and an LCD device capable of solving the problem of abnormal power-on display.

The aim of the present disclosure is achieved by the following technical scheme.

A driving method for an LCD panel comprising a plurality of timing control modules (T-CONs) comprises:

A. sending a feedback signal to a monitoring module after each of the T-CONs receives a data information required by power-on of a corresponding control area of the LCD panel;

B. generating control signals when the monitoring module receives the feedback signals of each of the T-CONs, and then simultaneously sending the control signals to each of the T-CONs;

C. sending a driving signal to drive display of the LCD panel when each of the T-CONs receives the control signal.

Furthermore, the data information required by power-on is stored in memory modules. In the step A, each of the T-CONs reads and obtains the data information from the memory modules, then sends the feedback signal. This is a specific feedback signal generation mechanism. Because each of the T-CONs sends the feedback signal after each of the T-CONs obtains the data information, when the control signal is fed back, each of the T-CONs is already stored with the data information, which avoids that no data information is sent when the control information is fed back is avoided, and increases the display reliability.

Furthermore, in the step B, a delay time that satisfies the monitoring module to receive all the feedback signals is preset in advance, the monitoring module starts to time when the monitoring module receives a first feedback signal, and the monitoring module sends the control signals when the time reaches the delay time. The delay time can be generated via experimental data so long as all of the feedback signals can be sent to the monitoring module within the delay time. Thus, the monitoring module can delay output as long as the monitoring module receives the feedback signals. The technical scheme is simple, and which reduces design cost.

A driver circuit for an LCD panel comprising a plurality of T-CONs comprises at least two T-CONs and a monitoring module; each of the T-CONs comprises a feedback unit and a receiving unit.

the feedback unit of each of the T-CONs sends a feedback signal to the monitoring module when each of the T-CONs receives the data information required by power-on of a corresponding control area of the LCD panel, the monitoring module generates control signals when the monitoring module receives the feedback signal of each of the T-CONs, and then simultaneously sends the control signals to each of the T-CONs, and each of the T-CONs sends driving signal to drive display of the LCD panel when the receiving unit of each of the T-CONs receives the control signal.

Furthermore, the monitoring module is configured with a timing module, and the timing module is stored with a delay that satisfies the monitoring module to receive all of the feedback signals, the monitoring module starts to time when the monitoring module receives a first feedback signal; and the monitoring module sends the control signals when the time reaches the delay time. The delay time can be generated via experimental data so long as all of the feedback signals can be sent to the monitoring module within the delay time. Thus, the monitoring module can delay output as long as the monitoring module receives the feedback signals. The technical scheme is simple, which reduces design cost.

Furthermore, the driver circuit for an LCD panel further comprises memory modules that stores the data information required for power-on, and the feedback unit send the feedback signal after each of the T-CONs reads the data information from the corresponding memory modules. This is a specific feedback signal generation mechanism. Because each of the T-CONs sends the feedback signals after each of the T-CONs obtains the data information, when the control signals are fed back, the T-CONs are already stored with the data information, which avoids no data information is sent when the control signal is fed back in each of the T-CONs, and increases display reliability.

Furthermore, each of the T-CONs corresponds to one memory module, and the T-CONs are in one-to-one correspondence with the memory modules. This is a specific memory module structure. Because the T-CONs are in one-to-one correspondence with the memory modules, if one memory module fails, reliable operation of rest of the memory modules is not affected, which increases circuit reliability.

Furthermore, the memory module is configured with at least two memory units, each of the memory units is stored with data information for power-on display of one T-CON, and the T-CONs are in one-to-one correspondence with the memory units. The technical scheme can reduce the number of the memory modules and hardware cost is reduced.

Furthermore, the feedback unit sends the feedback signal after each of the T-CONs reads data information. The monitoring module is configured with a timing module, and the timing module is stored with a delay time that satisfies the monitoring module to receive all the feedback signals; the monitoring module comprises a field programmable gate array (FPGA), the feedback signals of each of the T-CONs is sent to the FPGA, and the FPGA starts to time when the FPGA receives a first feedback signal; the FPGA sends the control signal when the time reaches the delay time. The memory module is an electrically erasable programmable read-only memory (EEPROM). This is a specific driver circuit.

An LCD device comprises a driver circuit for an LCD panel of the present disclosure.

The inventor finds by research that the T-CONs read timing data information and the like required for power-on and then feed back the data information to a field programmable gate array (FPGA), and the FPGA sends corresponding display data to the T-CONs. Because during the power-on, each of the T-CONs may asynchronously read the data information required for power-on, and even may unsuccessfully read, which causes the data information to be repeatedly read and read at a reduced speed, thus, the time that the FPGA sends the display data to all of the T-CONs may be different, and the display time of the display areas corresponding to all the T-CONs are different, resulting in an abnormal power-on display. In the present disclosure, because each of the T-CONs comprises a feedback unit and a receiving unit, the feedback unit sends a feedback signal to the monitoring module before the T-CON sends a driving signal to drive the display of the LCD panel, the monitoring module simultaneously sends control signals to each of the T-CONs when the monitoring module receives the feedback signals from all of the T-CONs, and the T-CON sends driving signals to drive the display of the LCD panel after the receiving unit receives the control signals. Thus, in the present disclosure, the time that each of the T-CONs receives the control signal are the same, thereby ensuring that the time that each of the T-CONs outputs the driving signal are the same. Thus, the display area of the LCD panel corresponding to each of the T-CONs can display synchronously, which solves abnormal display such as image display, color deviation, color distortion, and the like because of time asynchrony in the prior art.

DETAILED DESCRIPTION

The present disclosure provides a driving method for a liquid crystal display (LCD) panel, comprising:

A. sending a feedback signal to a monitoring module after a timing control module (T-CON) receives data information required by power-on of a corresponding control area of the LCD panel;

B. generating control signals when the monitoring module receives the feedback signals of all of the T-CONs, and simultaneously sending the control signals to all of the T-CONs;

C. sending driving signals to drive display of the LCD panel when all of the T-CONs receive the control signals.

The inventor finds by research that the T-CONs read timing data information and the like required for power-on and then feed back the data information to a field programmable gate array (FPGA), and the FPGA sends corresponding display data to the T-CONs. Because during the power-on, each of the T-CONs may asynchronously read the data information required for power-on, and even may unsuccessfully read, which causes the data information to be repeatedly read and read at a reduced speed, thus, the time that the FPGA sends the display data to all of the T-CONs may be different, and the display time of the display areas corresponding to all the T-CONs are different, resulting in an abnormal power-on display. In the present disclosure, because each of the T-CONs comprises a feedback unit and a receiving unit, the feedback unit sends a feedback signal to the monitoring module before the T-CON sends a driving signal to drive the display of the LCD panel, the monitoring module simultaneously sends control signals to each of the T-CONs when the monitoring module receives the feedback signals from all of the T-CONs, and the T-CON sends driving signals to drive the display of the LCD panel after the receiving unit receives the control signals. Thus, in the present disclosure, the time that each of the T-CONs receives the control signal are the same, thereby ensuring that the time that each of the T-CONs outputs the driving signal are the same. Thus, the display area of the LCD panel corresponding to each of the T-CONs can display synchronously, which solves abnormal display such as image display, color deviation, color distortion, and the like because of time asynchrony in the prior art.

The present disclosure will further be described in detail in accordance with the figures and the examples.

Figure 1:
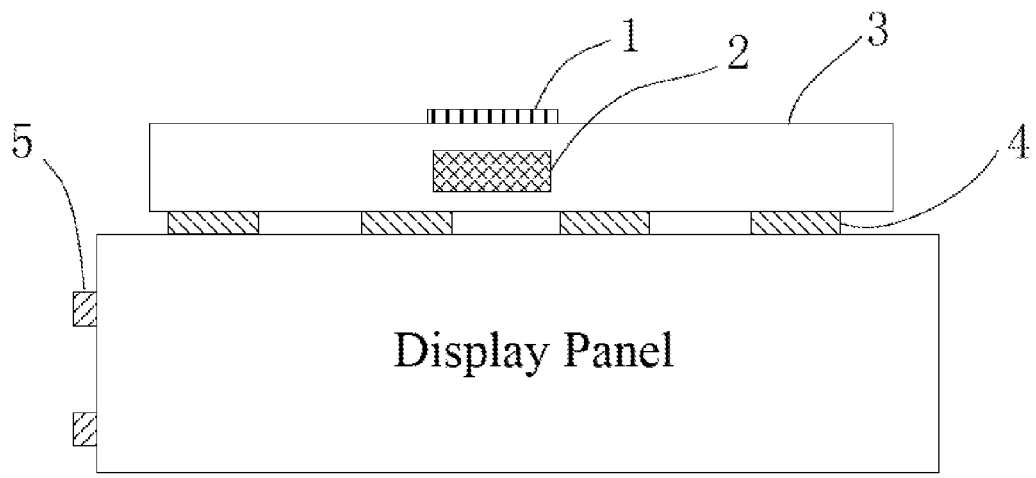
FIG. 1 is a schematic diagram of a typical high-level display device in the prior art.
Figure 2A:
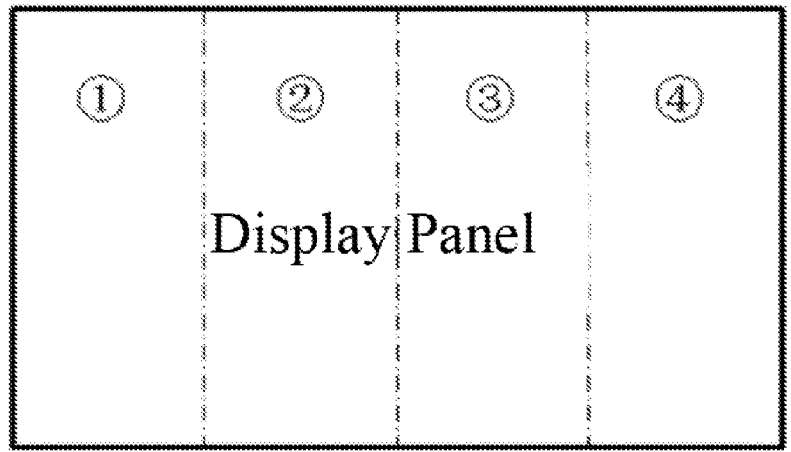
FIG. 2A is one schematic diagram of a subarea display of a panel in the prior art.
Figure 2B:
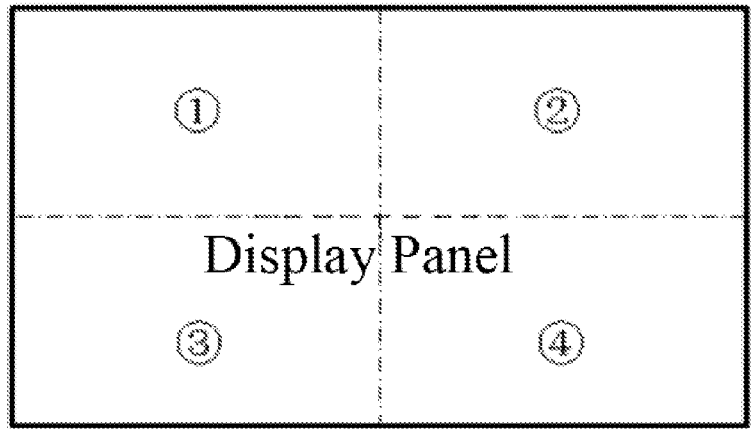
FIG. 2B is another schematic diagram of a subarea display of a panel in the prior art.
Figure 3:
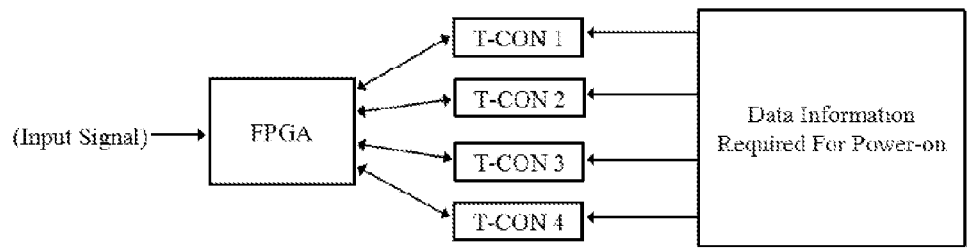
FIG. 3 is a schematic diagram of a subarea control of a panel in the prior art.
Figure 4:
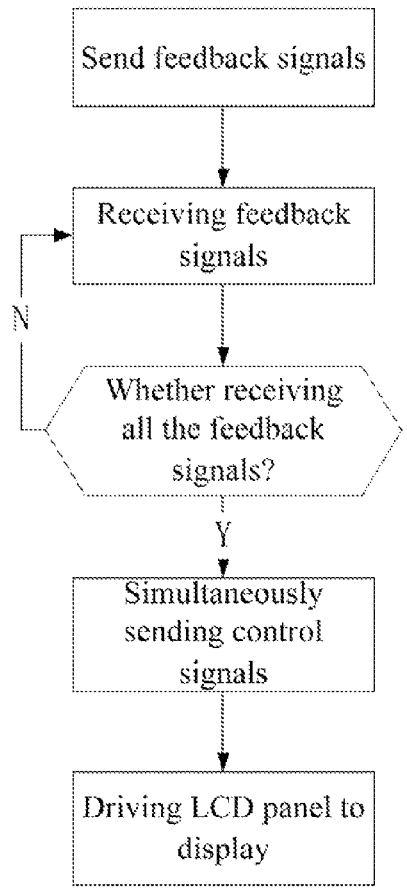
FIG. 4 is a schematic diagram of a driving method for a liquid crystal display (LCD) panel of an example of the present disclosure.

As shown in FIG. 4, the present disclosure provides a driving method for an LCD panel, comprising:

A. sending a feedback signal to a monitoring module after a timing control module (T-CON) receives data information required by power-on of a corresponding control area of the LCD panel. Each of the T-CONs reads and receives the data information from a memory module;

B. presetting a delay time that satisfies the monitoring module to receive all of the feedback signals in advance, starting to time when the monitoring module receives the first feedback signals, and the monitoring module sends control signals to each of the T-CONs when the time reaches the delay time. The delay time is generated via experimental data so long as all of the feedback signals can be sent to the monitoring module within the delay time;

C. sending driving signals to drive display of the LCD panel when the T-CONs receive the control signals.

In step A, because each of the T-CONs sends the feedback signal after each of the T-CONs obtains the data information, when the control signal is fed back, each of the T-CONs is already stored with the data information, which avoids no data information is sent when the control signal is fed back in each of the T-CONs, and increases display reliability.

In step B, the monitoring module can delay output as long as the monitoring module receives the feedback signals. The technical scheme is simple, which reduces design cost.

Figure 5:
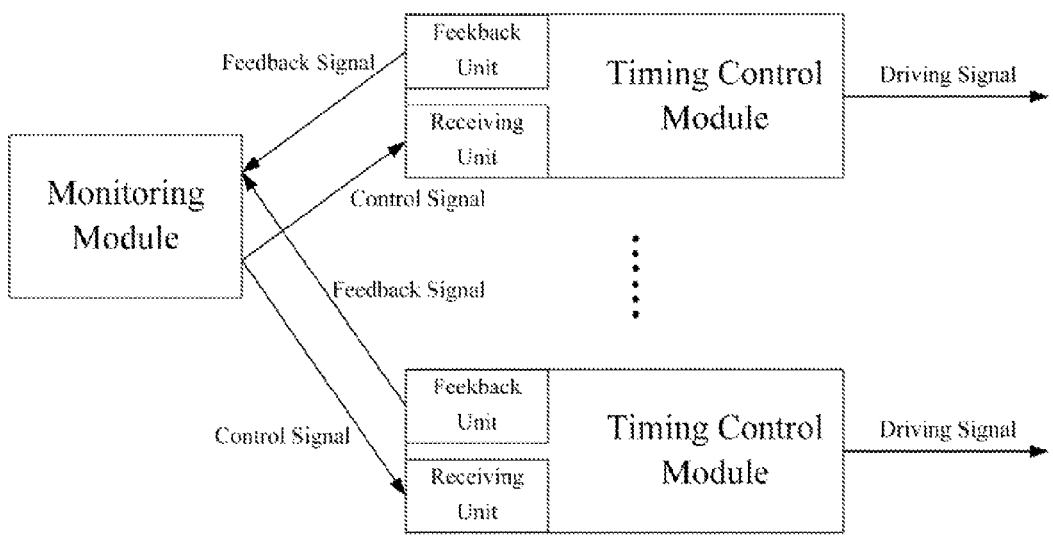
FIG. 5 is a schematic diagram of a driver circuit for an LCD panel of an example of the present disclosure.

As shown in FIG. 5, the present disclosure further provides an LCD device that comprises a driver circuit for an LCD panel. The driver circuit comprises at least two timing control modules. Each of the T-CONs comprises a feedback unit and a receiving unit. The driver circuit further comprises a monitoring module.

The feedback unit sends a feedback signal to the monitoring module before each of the T-CONs sends a driving signal that drives display of the LCD panel, the monitoring module simultaneously sends control signals to each of the T-CONs after the monitoring module receives all the feedback signals, and each of the T-CONs sends the driving signal to drive the display of the LCD panel after the receiving unit receives the control signal.

Figure 6:
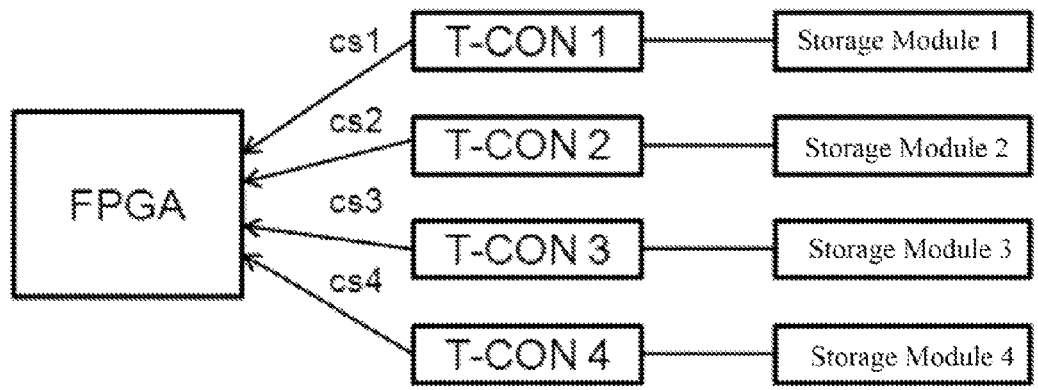
FIG. 6 is a schematic diagram of sending feedback signals of an example of the present disclosure.
Figure 7:
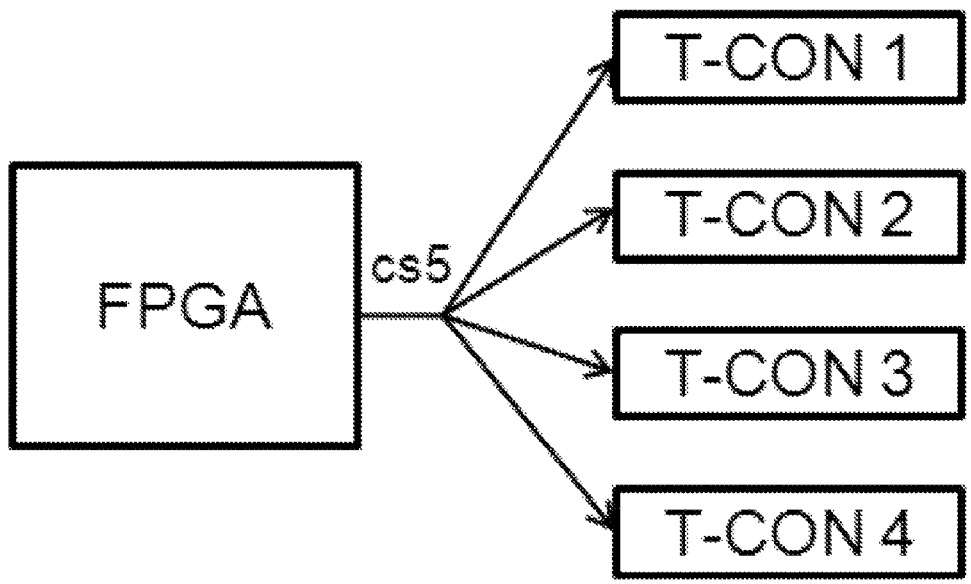
FIG. 7 is a schematic diagram of sending feedback signals of an example of the present disclosure.

As shown in FIG. 6 and FIG. 7, the driver circuit for an LCD panel further comprises memory modules stored with data information required by power-on display of the LCD panel, and the feedback unit sends the feedback signal (cs1/2/3/4) after each of the T-CONs reads the data information from each of the memory modules. The monitoring nodule is configured with a timing module, and the timing module is stored with a delay time that satisfies the monitoring module to receive all of the feedback signals. The monitoring module comprises a field programmable gate array (FPGA), the feedback signal of each of the T-CON is sent to the FPGA, the FPGA starts to time when the monitoring module receives the first feedback signal, and the monitoring module sends the control signal cs5 when the time reaches the delay time. The memory module comprises the electrically erasable programmable read-only memory (EEPROM).

The example is a specific feedback signal generation mechanism. Because each of the T-CONs sends the feedback signals after each of the T-CONs obtains the data information, when the control signal is fed back, each of the T-CONs is already stored with the data information, which avoids that no data information is sent when the control signal is fed back, and increases the display reliability.

The delay time is generated via experimental data so long as all of the feedback signals can be sent to the monitoring module within the delay time. Thus, the monitoring nodule can delay output as long as the monitoring module receives feedback signals. The technical scheme is simple, which reduces design cost.

In the present disclosure, because each of the T-CONs corresponds to a memory module, namely the T-CONs are in one-to-one correspondence with the memory modules, if one memory module fails, reliable operation of rest of the memory modules is not affected, which increases circuit reliability. Optionally, one memory module can be configured with at least two memory units as well. Each of the memory units is stored with data information required by power-on display of one T-CON, namely the T-CONs are in one-to-one correspondence with the memory modules. Thus, the number of memory modules and hardware cost is reduced.

The invention is described in detail in accordance with the above contents with the specific preferred examples. However, this present disclosure is not limited to the specific examples. For the ordinary technical personnel of the technical field, of the present disclosure, on the premise of keeping the conception of the present disclosure, the technical personnel can also make simple deductions or replacements, and all of which should be considered to belong to the protection scope of the present disclosure.

The invention claimed is:

1. A driving method for a liquid crystal display (LCD) panel comprising a plurality of timing control modules (T-CONs), comprising:

A. sending a feedback signal to a monitoring module after each of the T-CONs receives data information required by power-on of a corresponding control area of the LCD panel;
   B. generating control signals when the monitoring module receives the feedback signal of each of the T-CONs, and then simultaneously sending the control signals to each of the T-CONs;
   C. sending a driving signal to drive display of the LCD panel when each of the T-CONs receives the control signal.

2. The driving method for the LCD panel comprising the plurality of the T-CONs of claim 1, wherein the data information required by power-on is stored in the memory modules; in step A, each of the T-CONs reads and obtains the data information from the memory modules, then sends the feedback signal.

3. The driving method for the LCD) panel comprising the plurality of the T-CONs of claim 1, wherein in the step B, a delay time that satisfies the monitoring module to receive all of the feedback signals is preset in advance; the monitoring module starts to time when the monitoring module receives a first feedback signal; and the monitoring module sends the control signals when the time reaches the delay time.

4. A driver circuit for a liquid crystal display (LCD) panel comprising a plurality of timing control modules (T-CONs), comprising:
   at least two T-CONs, wherein each of the T-CONs comprises a feedback unit and a receiving unit; and
   a monitoring module; wherein the feedback unit of each of the T-CONs sends a feedback signal to the monitoring module when each of the T-CONs receives the data information required by power-on of a corresponding control area of the LCD panel, the monitoring module generates control signals when the monitoring module receives the feedback signal of each of the T-CONs, and then simultaneously sends the control signals to each of the T-CONs, and each of the T-CONs sends driving signal to drive display of the LCD panel when the receiving unit of each of the T-CONs receives the control signal.

5. The driver circuit for the LCD panel comprising the plurality of the T-CONs of claim 4, wherein the monitoring module is configured with a timing module, and the timing module is stored with a delay time that satisfies the monitoring module to receive all of the feedback signals; the monitoring module starts to time when the monitoring module receives a first feedback signal; and the monitoring module sends the control signals when the time reaches the delay time.

6. The driver circuit for the LCD panel comprising the plurality of the T-CONs of claim 4, wherein the driver circuit further comprises memory modules that store the data information required for power-on, and the feedback unit sends the feedback signal after each of the T-CONs reads the data information from the corresponding memory module.

7. The driver circuit for the LCD panel comprising the plurality of the T-CONs of claim 6, wherein each of the T-CONs corresponds to a memory module, and the T-CONs are in one-to-one correspondence with the memory modules.

8. The driver circuit for the LCD panel comprising the plurality of the T-CONs of claim 6, wherein the memory module is configured with at least two memory units; each of the memory units is stored with the data information of one T-CON, and the T-CONs are in one-to-one correspondence with the memory units.

9. The driver circuit for the LCD panel comprising the plurality of the T-CONs of claim 4, wherein the driver circuit further comprises memory modules that store the data information required for power-on; the feedback unit sends the feedback signal after each of the T-CONs reads the data information from the corresponding memory modules; the monitoring module is configured with a timing module, and the timing module is stored with a delay time that satisfies the monitoring module to receive all of the feedback signals; the monitoring module comprises a field programmable gate array (FPGA), the feedback signal of each of the T-CONs is sent to the FPGA, the FPGA starts to time when the FPGA receives a first feedback signal; the FPGA sends the control signal when the time reaches the delay time; the memory module is an electrically erasable programmable read-only memory (EEPROM).

10. A liquid crystal display (LCD) device, comprising:
a driver circuit for an LCD panel comprising a plurality of timing control modules (T-CONs),
wherein the driver circuit comprises at least two T-CONs and a monitoring module, and each of the T-CONs comprises a feedback unit and a receiving unit;
wherein the feedback unit of each of the T-CONs sends a feedback signal to the monitoring module when each of the T-CONs receives the data information required by power-on of a corresponding control area of the LCD panel, the monitoring module generates control signals when the monitoring module receives the feedback signal of each of the T-CONs, and sends the control signals to each of the T-CONs, and each of the T-CONs sends driving signal to drive display of the LCD panel when the receiving unit of each of the T-CONs receives the control signals.

11. The LCD device of claim 10, wherein the monitoring module is configured with a timing module, the timing module is stored with a delay time that satisfies the monitoring module to receive all of the feedback signals; the monitoring module starts to time when the monitoring module receives a first feedback signal, and the monitoring module sends the control signals when the time reaches the delay time.

12. The LCD device of claim 10, wherein the driver circuit further comprises memory modules that store the data information required for power-on, and the feedback unit sends the feedback signals after the each of the T-CONs reads the data information from the corresponding memory module.

13. The LCD device of claim 12, wherein each of the T-CONs corresponds to a memory module, and the T-CONs are in one-to-one correspondence with the memory modules.

14. The LCD device of claim 12, wherein the memory module is configured with at least two memory units; each of the memory units is stored with the data information of one T-CON, and the T-CONs are in one-to-one correspondence with the memory units.

15. The LCD device of claim 10, wherein the driver circuit further comprises memory modules that store the data information required for power-on, and the feedback unit sends the feedback signals after each of the T-CONs reads the data information from the corresponding memory modules; the monitoring module is configured with a timing module, and the timing module is stored with a delay time that satisfies the monitoring module to receive all the of feedback signals; the monitoring module comprises a field programmable gate array (FPGA), the feedback signal of each of the T-CONs is sent to the FPGA, the FPGA starts to time when the FPGA receives a first feedback signal; the FPGA sends the control signal when the time reaches the delay time; the memory module is an electrically erasable programmable read-only memory (EEPROM).

* * * * *